(12) United States Patent
Dave et al.

(10) Patent No.: US 9,524,500 B2
(45) Date of Patent: Dec. 20, 2016

(54) TRANSFERRING ASSETS

(71) Applicant: Apple Inc., Cupertino, CA (US)

(72) Inventors: Swapnil R. Dave, Santa Clara, CA (US); Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/675,894

(22) Filed: Nov. 13, 2012

(65) Prior Publication Data

US 2014/0136349 A1   May 15, 2014

(51) Int. Cl.
*G06Q 20/00* (2012.01)
*G06Q 20/20* (2012.01)
*G06Q 20/28* (2012.01)
*G06Q 20/36* (2012.01)
*G06Q 20/12* (2012.01)
*G06Q 20/32* (2012.01)

(52) U.S. Cl.
CPC ............. *G06Q 20/20* (2013.01); *G06Q 20/12* (2013.01); *G06Q 20/28* (2013.01); *G06Q 20/32* (2013.01); *G06Q 20/3274* (2013.01); *G06Q 20/36* (2013.01); *G06Q 20/363* (2013.01); *G06Q 20/367* (2013.01)

(58) Field of Classification Search
None
See application file for complete search history.

(56) References Cited

U.S. PATENT DOCUMENTS

| | | | |
|---|---|---|---|
| 5,461,217 A * | 10/1995 | Claus | 235/380 |
| 6,519,650 B1 * | 2/2003 | Kawasaki et al. | 709/244 |
| 6,578,014 B1 * | 6/2003 | Murcko, Jr. | 705/80 |
| 6,601,033 B1 * | 7/2003 | Sowinski | 705/35 |
| 7,415,439 B2 * | 8/2008 | Kontio et al. | 705/53 |
| 8,327,147 B2 * | 12/2012 | van Herrewegen et al. | 713/175 |
| 8,589,267 B2 * | 11/2013 | Hurst | 705/35 |
| 2001/0007983 A1 * | 7/2001 | Lee | 705/69 |
| 2002/0049681 A1 * | 4/2002 | Herreweghen | 705/64 |
| 2005/0108027 A1 * | 5/2005 | Horger | 705/1 |
| 2006/0167823 A1 * | 7/2006 | York et al. | 705/76 |
| 2006/0253335 A1 * | 11/2006 | Keena et al. | 705/26 |
| 2007/0112676 A1 * | 5/2007 | Kontio et al. | 705/50 |
| 2007/0294528 A1 * | 12/2007 | Shoji et al. | 713/159 |
| 2009/0265272 A1 * | 10/2009 | Dill et al. | 705/41 |
| 2011/0076941 A1 * | 3/2011 | Taveau et al. | 455/41.1 |
| 2012/0323787 A1 * | 12/2012 | Nelsen | 705/44 |
| 2013/0151360 A1 * | 6/2013 | Scipioni et al. | 705/21 |
| 2013/0165157 A1 * | 6/2013 | Mapes | 455/456.5 |
| 2013/0218769 A1 * | 8/2013 | Pourfallah et al. | 705/44 |
| 2013/0219289 A1 * | 8/2013 | Anton et al. | 715/748 |

* cited by examiner

*Primary Examiner* — Fateh M Obaid
(74) *Attorney, Agent, or Firm* — Polsinelli LLP

(57) ABSTRACT

Disclosed herein are systems, methods, and non-transitory computer-readable storage media for sending transfer requests, receiving approvals, and carrying out transfers in a digital wallet application. A mobile payment engine receives a request from a client application associated with a first digital card to apply assets from at least one additional digital card to the first digital card, receives receiving approval to transfer assets from the at least one additional digital card to the first digital card, and transfers the assets to the first digital card. Transfers can be made between digital cards in the same client's digital wallet application and transfers can be made between multiple client device accounts.

27 Claims, 14 Drawing Sheets

TRANSFERRING ASSETS

BACKGROUND

1. Technical Field

The present disclosure relates to using digital assets to perform transactions and more specifically to transferring digital assets.

2. Introduction

Many financial, gatekeeping, and other transactional instruments currently exist for carrying out transactions between two or more parties. With respect to financial transactions, payments may be made using cash, credit cards, debit cards, checks, electronic checks, and so forth. With the growth of the popularity of consumer electronics, many consumers prefer to consolidate items of commerce into digital forms. However, current systems for transferring financial assets are insufficiently suited for integration with a digital experience using modern consumer electronic devices. Likewise, gatekeeping transactions such as airline travel ticketing and screening services, movie ticketing systems, hotel ticketing systems, gym membership authentication systems, building/parking pass systems, etc. lack sophisticated digital adoption.

Additionally, existing systems for transferring known transactional instruments are lacking with respect digital integration, adoption, and convenience. Consequently, what are needed are more sophisticated systems, methods, and computer-readable media for transferring assets.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for transferring assets from one digital card in a digital wallet application to another digital card.

Some embodiments of the disclosure involve storing a plurality of merchant-specific prepaid user accounts in a database with each account of the plurality of accounts being associated with a particular user whereby a user may purchase goods or services from the specific merchant by drawing from funds available in the account. Some embodiments involve an interface that allows a user to request a transfer of funds from a first merchant-specific prepaid user account to a second merchant-specific prepaid user account. The mobile payment engine can update a funds balance in the second merchant-specific prepaid user account by adding to it an amount of funds transferred from the first merchant-specific prepaid user account. The digital wallet application can also allow a user of a client device to use the transferred funds to complete a transaction with the merchant associated with the user's prepaid account.

In some embodiments, the first merchant-specific prepaid user account is associated with a user different than a user associated with the second merchant-specific prepaid user account. An interface can allow users of client devices to request approval of the user associated with the first merchant-specific prepaid user account for assets. The interface can also be configured for receiving an approval from the other account prior to updating the funds balance.

A mobile payment engine can send transfer requests, receive approvals, and carry out transfers. The mobile payment engine can receive a request from a client application associated with a first digital card to apply assets from at least one additional digital card to the first digital card, can receive approval to transfer assets from the at least one additional digital card to the first digital card, and can transfer the assets to the first digital card. Transfers can be made between digital cards in the same client's digital wallet application and transfers can be made between multiple client device accounts.

In some embodiments of the disclosed technology, conditions are placed on the approval of a transfer request such as temporal, geographic, subject matter, etc. In some examples, the transfer includes a fixed amount or a predetermined duration of use.

The mobile payment engine can provide the client application with an optical code which, when scanned during a transaction, applies assets from the at least one digital card to the transaction.

The digital wallet application can identify a group of one or more trusted other users who will receive automatic or semi-automatic approval for transfer requests. Also, the digital wallet application can reconcile a group bill by requesting that a mobile payment engine transfer digital card assets in a manner specified by a party of diners.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure addresses the need in the art for more sophisticated systems, methods, and computer-readable media for transferring assets. In some embodiments of the disclosure, systems, methods and non-transitory computer-readable media can transfer assets from one digital card in a digital wallet application to another digital card.

Digital Wallet

Figure 1:
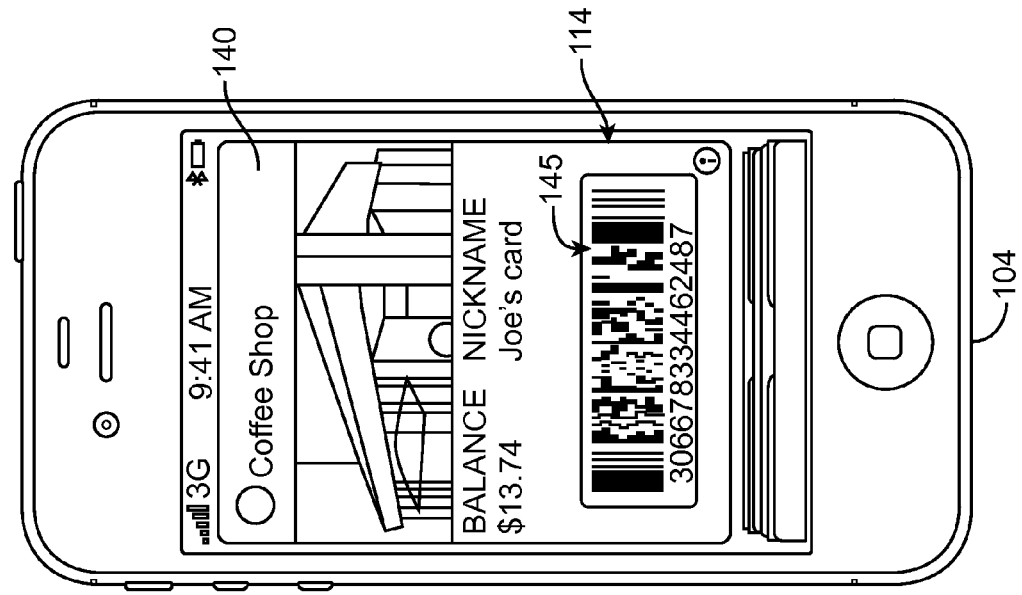
FIG. 1 illustrates an exemplary application interface for carrying out transactions using digital cards in a digital wallet.
Figure 1:
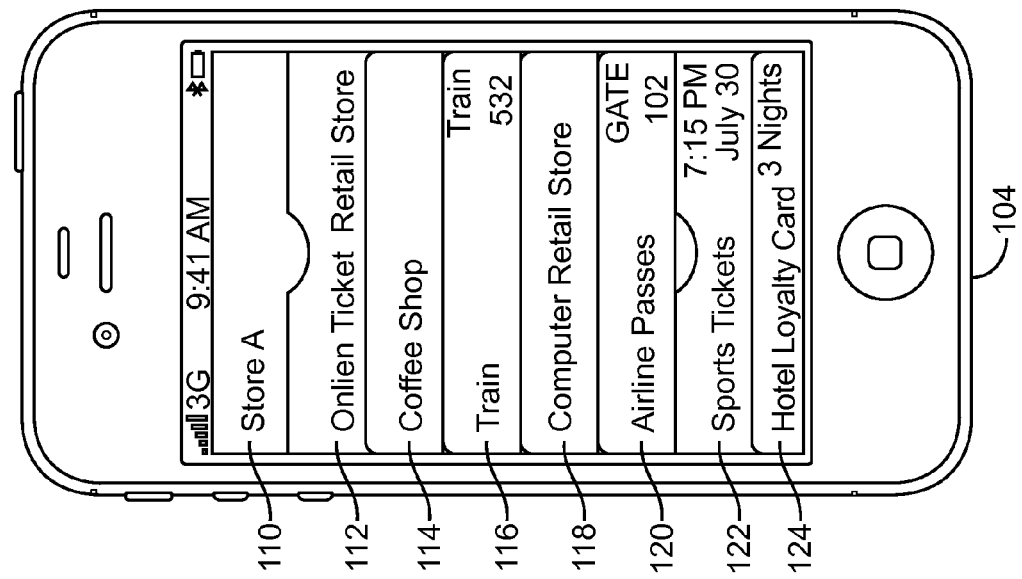
Figure 1:
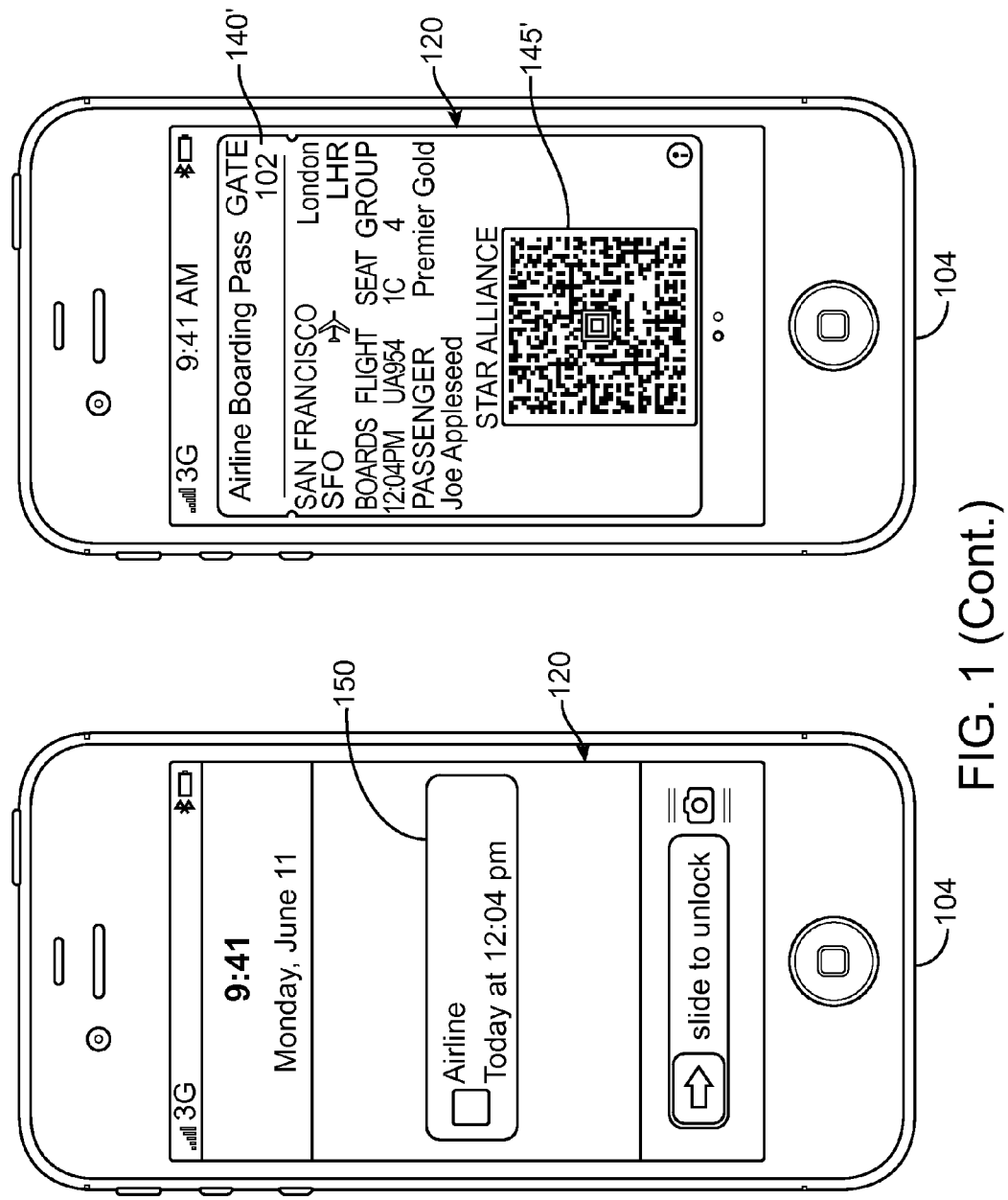

The disclosure involves systems, methods, and computer-readable media which provide computing devices the ability to effect financial transactions and gatekeeping functions from the device itself using a radio signal, an optical code, or both a radio signal and an optical code. FIG. 1 illustrates exemplary application interface for carrying out transactions using digital cards in a digital wallet. As shown in FIG. 1, a computing device 104 runs an application for displaying a digital wallet interface comprising a plurality of digital cards 110, 112, 114, 116, 118, 120, 122, 124 in a wallet configuration. The digital cards can include digital representations of merchant-specific prepaid account cards, merchant-specific credit cards, all-purpose credit cards, airline boarding passes, other transportation tickets, movie tickets, sporting event tickets, gift cards, loyalty cards, mobile coupons, identification cards, bank and debit cards, etc. Likewise, the digital cards can be associated with user accounts, online profiles, financial accounts, retail store accounts, loyalty accounts, coupon subscription accounts, etc.

The wallet configuration can include a vertical stack of digital cards with only a small part of the digital card being visible. In some embodiments, the visible portion of the digital cards 110, 112, 114, 116, 118, 120, 122, 124 provides information about the card. For example, in the wallet configuration, the visible part of digital card 110 displays information relating to a retail store that the digital card 110 is issued from. In another example, in the wallet configuration, the visible part of digital card 120 displays the name of an airline and information about an upcoming flight.

The digital cards 110, 112, 114, 116, 118, 120, 122, 124 can be interactive such that hovering over a card with an input method such as a mouse cursor or a single finger placement on a touch screen causes the computing device 104 to display a thumbnail view of a detailed card interface. Likewise, selecting a digital card with a mouse click or single finger tap on a touch screen causes the computing device 104 to display a full detailed card interface 140.

In some embodiments of the disclosure, a detailed card interface 140 provides additional information about the digital card, the account associated with the digital card, or both. Additionally, the detailed card interface 140 can display an optical code 145 for effecting a financial transaction. Also, a detailed card interface 140' can display an optical code 145' used to provide entrance in a gatekeeping application. As discussed below, a digital card interface can include an interface for transferring assets.

Additionally, one or more of the digital cards 110, 112, 114, 116, 118, 120, 122, 124 can provide notifications through the computing device 104 relating to an event. For example, according to FIG. 1, an application can associate an airline reservation system with digital card 120 to update the computing device with changes to air travel and to provide the user of the computing device 104 with one or more notifications 150 relating to a flight itinerary. As discussed below, some embodiments of the disclosure involve receiving notifications relating to digital card asset transfer requests.

A digital wallet application can provide great convenience to users by centralizing all of a user's retail card accounts, travel accounts, loyalty program accounts, etc. such that the user can open a single application to access any of his/her accounts by tapping on a card. Also, digital cards can replace the need to carry cash or credit cards when a user has merchant-specific prepaid digital cards. Additionally, some embodiments of the disclosure also involve systems, methods, and computer readable media for providing digital wallet applications the ability to transfer assets from an account associated with digital card to another, transfer assets between a first client device and another client device, or both transfer between accounts and transfer between devices.

Some examples of assets include cash, credit, reward points, airline frequent flyer points, coupons, loyalty points, promotions, gatekeeper passes, etc. Although some specific examples of assets are disclosed explicitly herein, those with ordinary skill in the art having the benefit of this disclosure will readily understand that any type of transferrable asset can benefit from the disclosure.

Digital Asset Transfers

Figure 2:
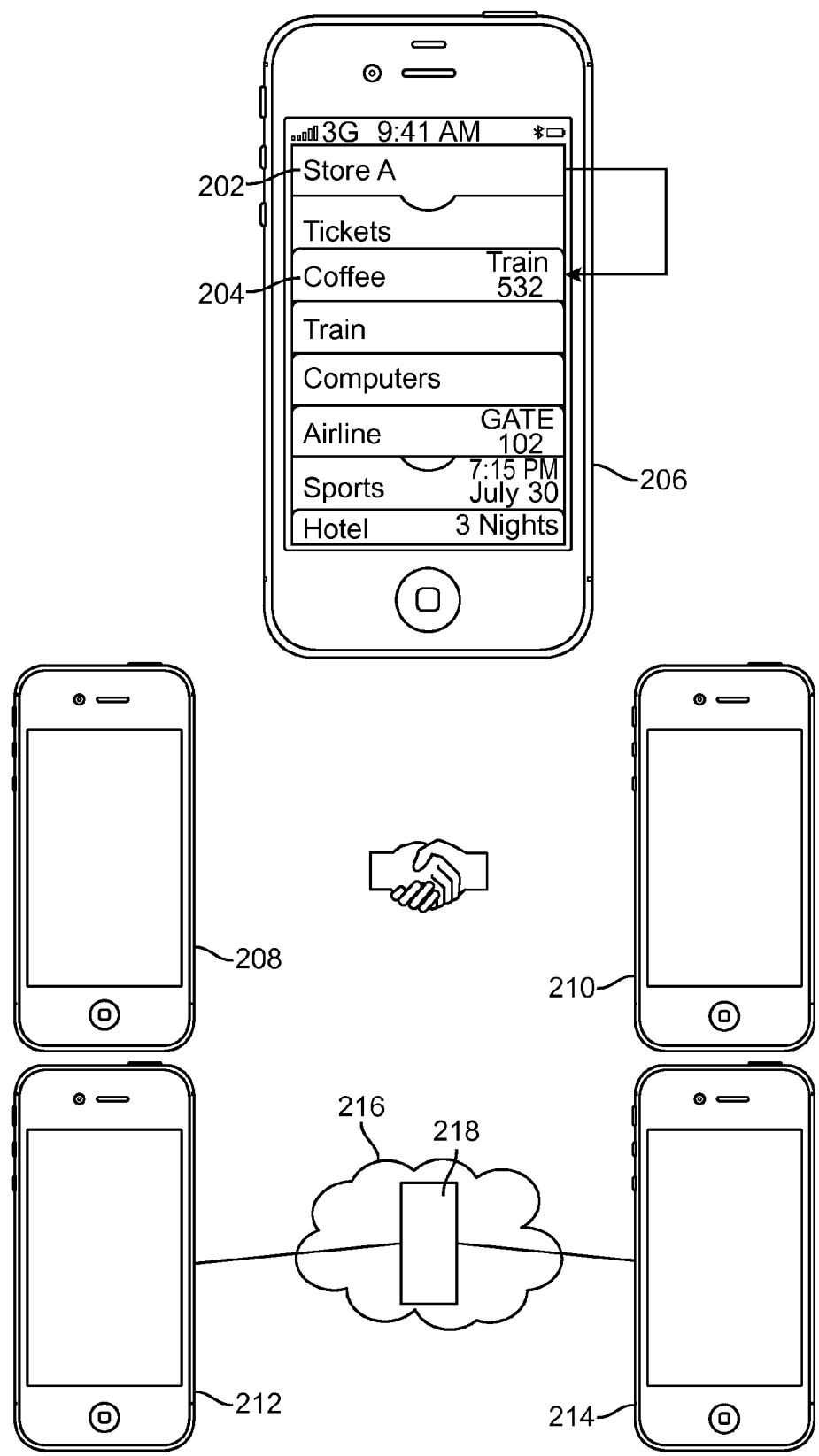
FIG. 2 illustrates various systems for transferring assets between digital cards and between client devices according to some embodiments of the disclosure.

FIG. 2 illustrates various systems for transferring assets between digital cards and between client devices according to some embodiments of the disclosure. In some embodiments of the disclosure, assets are transferred between digital cards 202, 204 on the same device 206. In some embodiments, assets are transferred between a first device 208 and a second device 210 via one or more wireless communication protocol such as Bluetooth™, Wifi, Near Field Communication, etc. In some embodiments of the disclosure, assets are transferred from a first device 212 to a second device 214 over one or more networks 216 via a central server 218.

System Architecture

Figure 3:
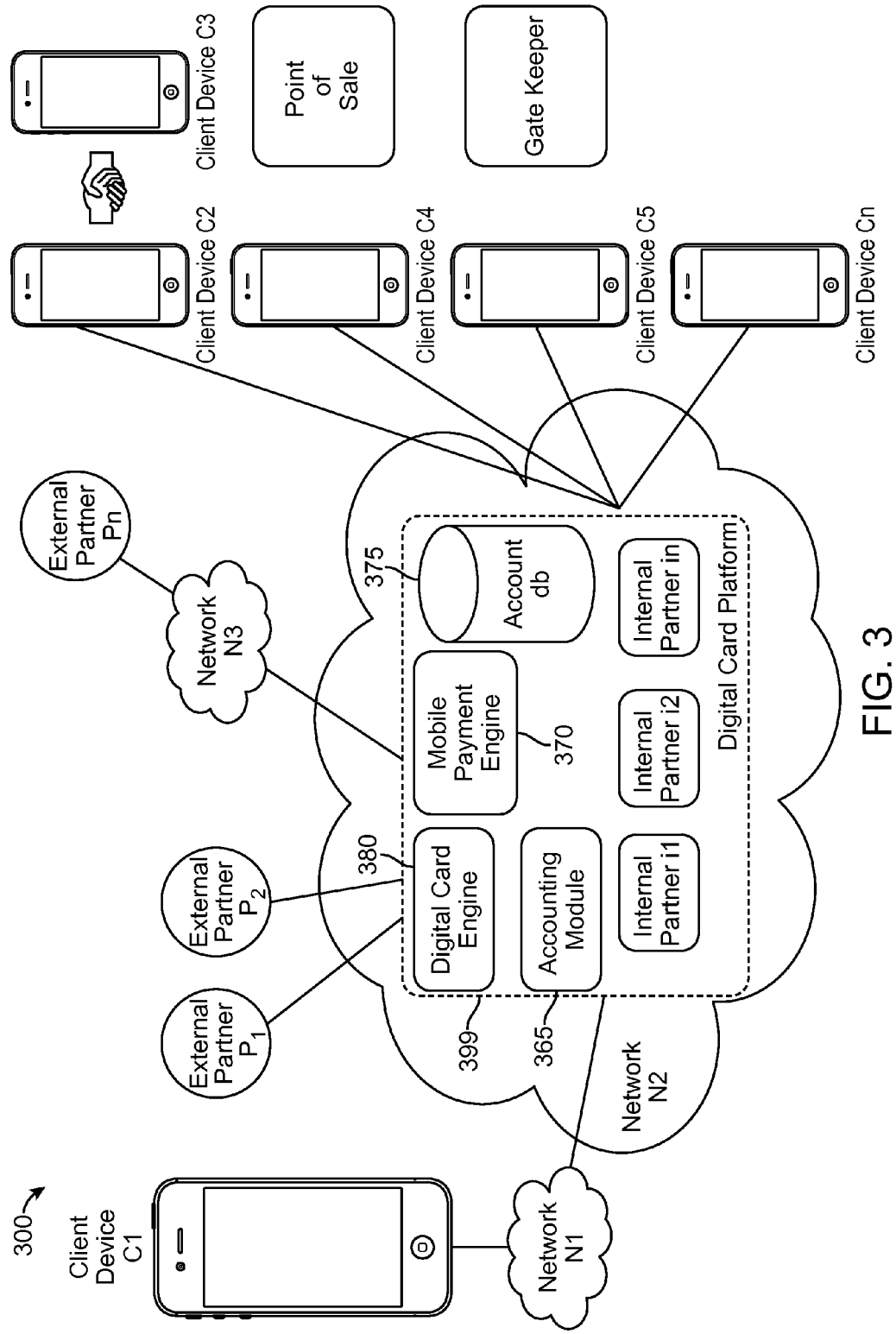
FIG. 3 illustrates a system with a network-based mobile payment platform configured to manage digital cards for a plurality of client device and to transfer assets between a plurality of digital card accounts and a plurality of users according to some embodiments of the disclosure.

Some embodiments of the disclosure involve a system configured to facilitate all of the various types of asset transfers between a plurality of client devices and between digital cards for a plurality of internal and external partners. FIG. 3 illustrates an exemplary system 300 with a network-based mobile payment platform 399 configured to manage digital cards for a plurality of client devices and to transfer assets between a plurality of digital card accounts and a plurality of users. The mobile payment platform 399 can be operatively coupled with a plurality of client devices $C_1, C_2, C_3, C_4, C_5 \ldots C_n$, via one or more networks $N_1, N_2, N_3$. The networks $N_1, N_2, N_3$ can include any type of network, now known or later developed, and can include the same network or different networks.

The mobile payment platform 399 can include a digital card engine 380 configured for managing digital cards and user accounts associated with those digital accounts for one or more external partners $P_1, P_2, \ldots P_n$.

The one or more external partners $P_1, P_2, \ldots P_n$ can offer client devices the ability to use digital cards to effectuate transactions such as financial transactions, gatekeeper transactions, etc. In some embodiments of the disclosure, the mobile payment platform 399 maintains financial accounts, ticketing accounts, user accounts, etc. for some or all of the external partners $P_1, P_2, \ldots P_n$. Conversely, in some embodiments of the disclosure, the one or more external partners $P_1, P_2, \ldots P_n$ maintain servers and processing engines to manage their own financial accounts, ticketing accounts, user accounts, etc. for transactions conducted using their digital cards. In yet other embodiments, the one or more external partners $P_1, P_2, \ldots P_n$ perform some digital card maintenance tasks while the mobile payment platform 399 performs others.

In some examples, external partner $P_1$ can include a merchant and the digital card engine 380 manages merchant-specific prepaid accounts, loyalty points, coupons, etc. for clients with a digital card for making purchases with that merchant. For example, the digital card engine 380 can cause the client device $C_4$ to display a unique optical code containing a coupon that can be used during a point of sale transaction with the merchant.

Additionally, external partner $P_2$ can include a business having a gatekeeping function such as a movie theatre, an airline company, a gym, etc. For example, the digital card engine 380 can manage the delivery of gatekeeper entry credentials such as movie tickets, boarding passes, gym id cards, etc.

In another example, an airline company and the digital card engine can manage the exchange of flight information and account information between a client device associated with a user account and the airline company. When a flight is delayed, the external partner $P_2$ can notify the digital card engine 380 via the digital card platform 399 and the digital card engine 380 can notify a client device associated with that user account. Likewise, when a user uses the airline's digital card to check into a flight, the digital card management engine 380 can provide the airline's digital card on client device $C_5$ with an optical code that can be used to clear security, the airline's flight terminal gatekeeper, or both. Additionally, the digital card engine 380 can manage a frequent flier mileage or rewards account.

In some embodiments of the disclosed technology, the mobile payment platform 399 includes one or more internal partners $i_1, i_2, i_3, \ldots i_n$ and the digital card engine 380 is further configured for managing digital card accounts for one or more internal partners.

For example, in some cases the digital card platform 399 can include a platform such as PASSBOOK, available from Apple Inc. of Cupertino, Calif., and the one or more internal partners $i_1, i_2, \ldots i_n$ can include the Apple Online Store, the iTunes store, and the App Store, each available from Apple Inc. of Cupertino, Calif. Additionally, the digital card engine 380 can manage a user account associated with one or more internal partners. Likewise, an internal partner can provide the digital wallet application for client devices to download and the internal partner can provide notifications, updates, etc.

In some embodiments of the present disclosure, the mobile payment platform 399 also includes a mobile payment engine 370 configured for management of transactions between client devices and the external and internal partners. Also, the mobile payment engine can be operatively coupled with an account database 375 configured for storing user account information and user-financial account information.

The mobile payment engine 370 can receive a request form a merchant partner to process a transaction request by a client device using a digital card. In some embodiments, the request is automatically sent upon a point of sale scanner recognizing an optical code associated with a digital card displayed on a client device. The mobile payment engine 370 can access the account of a user associated with the digital card and determine if the account has sufficient funds to satisfy the merchant's stated sale price.

Although a sales transaction is described herein, those with ordinary skill in the art having the benefit of this disclosure will readily appreciate that the present disclosure can be applied to any type of transaction including, but not limited to sales, leases, rentals, licenses, etc.

The mobile payment engine 370 can manage various types of asset transfer requests, approvals, and actual asset transfers. As explained above with reference to FIG. 2, there are various ways for transferring assets between devices and between cards. Indeed, the mobile payment engine 370 can be configured for effectuating the various types of transfers. For example, the mobile payment engine 370 can receive a request from a client device $C_1$ to transfer assets from one card to another, look up the user accounts associated with cards in the account database 375, query the partners whose cards are subject to the request for approval, receive approval, and effect the transfer. For example, the mobile payment engine 370 can receive a notification from a client device $C_2$ that the client device $C_2$ and a client device $C_3$ are requesting a device to device transfer, look up the user accounts subject to the transfer request, query the partners associated with the request, receive approval to transfer assets, and provide an authorization to the client device $C_2$ allowing the client device $C_2$ to transfer assets to client device $C_3$ via an optical code, radio signal, etc.

Additionally, the mobile payment engine 370 can receive a request from a client device $C_1$ to transfer assets from client device $C_2$ over one or more networks, look up user accounts subject to the transfer request, query partners associated with the request, receive approval to transfer assets, and transfer the assets.

The request from client device $C_1$ can be accompanied with information identifying the client device $C_2$. For example, the identification information can include a phone number associated with client device $C_2$, an email address associated with client device $C_2$, a universal device identifier associated with client device $C_2$, an IP address associated with client device $C_2$, etc.

In some embodiments of the disclosed technology, the mobile payment engine 370 is configured to compare identification information received, compare the identification information with the account database 375, and route a request. Likewise, the mobile payment engine 370 can route a response to the request to client device $C_1$ from client device $C_2$.

Similarly, some embodiments of the disclosed technology involve an accounting module 365 operatively coupled with the mobile payment engine 370. The accounting module 365 can maintain records of asset transfers between client devices and records relating to how a client device uses digital cards with external and internal partners.

Client devices can access the accounting module 365 via an interface in the digital wallet application. Indeed, the interface can allow the user of the client device to monitor the status and usage of one or more transfers. For example, in the case of a transfer of an open amount of assets for an open amount of time (as explained in more detail below), the accounting module 365 allows a lender to monitor when, where, and how those assets are being consumed. Likewise, in the case of a lender transferring a pool of assets to multiple parties (also explained below), the accounting module 365 can allow the lender to monitor who is using the assets. Similarly, the accounting module 365 can be configured to allow a lender to create partitions in a pool of transferred assets to earmark assets for one party or another, or to create buckets of assets with permissions associated with who can withdraw from a bucket and under what conditions.

Also, the accounting module 365 can provide the digital wallet application with an interface for setting rules relating to transferred assets. In some embodiments, the interface can allow temporal restrictions, geographical restrictions, content restrictions, etc. on the situations in which a recipient of an asset transfer can use the assets. For example, suppose a university offers a digital card for a student meal plan, the campus library contains a café that offers a digital card, and an off-campus shopping center offers a digital card. Using the accounting module 365 interface, parents of a student can transfer assets and set controls to allow their child who attends the university to have unlimited access to the library café, access to the dining hall only between the hours of 7:00 AM and 8:00 PM, and limited funds for the off-campus shopping center that are only available on weekends.

As mentioned briefly above, the digital card platform 399 and the mobile payment engine 370 can transfer assets in a number of ways. FIGS. 4-10 illustrate some of the various systems and methods of transferring assets using a digital card platform according to some embodiments of the disclosed technology.

Optical Code Transfer

Figure 4:
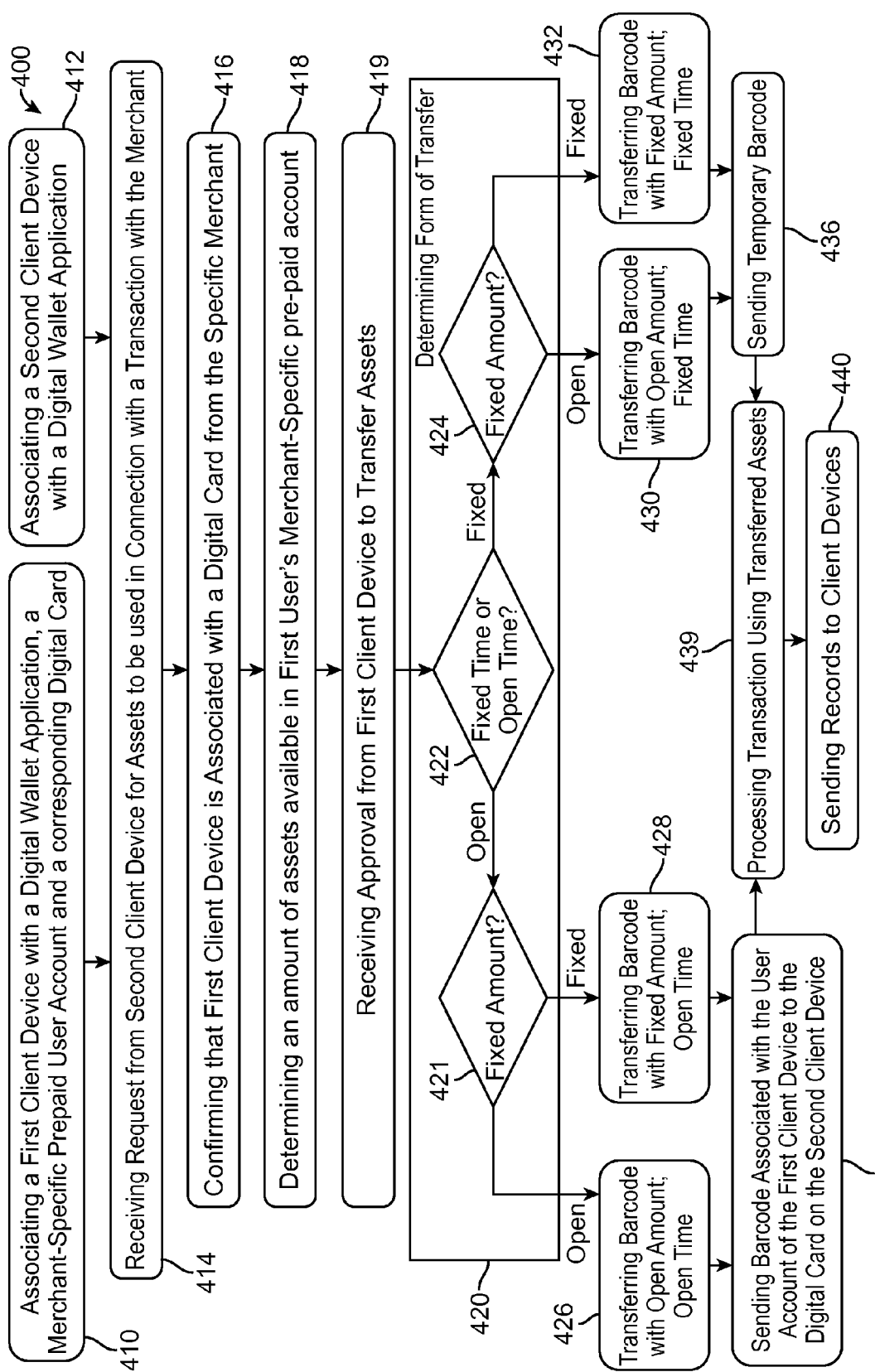
FIG. 4 illustrates an exemplary method of transferring assets via an optical code.

FIG. 4 illustrates an exemplary method 400 of transferring assets via an optical code. The method 400 begins with associating 410 a first client device with a digital wallet application, a merchant-specific prepaid user account, and a corresponding digital card. Likewise, the method 400 involves associating 412 a second client device with a digital wallet application.

Next, the method 400 involves the first client device receiving a request from the second device for assets to be used in connection with a transaction with the merchant 414. For example, the request can be received by way of a server and a mobile payment engine. In some embodiments, the request is received via a short-range handshaking protocol, e.g. Bluetooth, NFC, etc. Also, the request can be received via an SMS message, an in-application ping to an Internet Protocol address, etc. Additionally, the second device can receive a notification relating to the received request as will be discussed in more detail below.

Some embodiments of the present disclosure involve confirming that the first client device is associated with the merchant 416 and determining an amount of assets that are available in the first user's account 418.

Next, the method 400 involves receiving approval from the first device to transfer the assets 419 and determining the form of the transfer 420. Determining the form of the transfer 420 can include determining if the approval is for a fixed time or for an open time 422 and determining if the approval is for a fixed amount or open amount 421, 424. In the event that the approval includes an approval to transfer assets for an open amount of time, the method 400 involves transferring an optical code 434 to the second client device in a semi-permanent or permanent digital card containing an open amount of assets 426 or containing a fixed amount of assets 428. In the event that the approval includes an approval to transfer assets for a fixed amount of time, the method 400 involves transferring to the second client device an optical code in a temporary digital card 438 containing an open amount of assets 430 or containing a fixed amount of assets 432.

Next, the method 400 involves the second client device using the transferred optical code for processing a transaction 439 using transferred funds 436. For example, using a temporary optical code to process a transaction 439 can include scanning the optical code, receiving an indication from a server-based mobile payment engine that the code was transferred from another account, requesting that assets be drawn from the other account, receiving confirmation that the assets have been withdrawn, and completing the transaction.

Also, the step of sending a permanent or semi-permanent barcode associated with transferred assets can include creating a new account with a merchant, withdrawing assets from the transferor's account, depositing the assets in the new account, and associating the new account with the requestor. In these embodiments, using a temporary optical to process 439 a transaction involves scanning the optical code of the new account, requesting that assets be drawn from the new account, receiving confirmation that the assets have been withdrawn, and completing the transaction.

Additionally, the method 400 can involve sending transfer records to the first device, the second device, or both the first device and second device 440.

Balance Transfer

In some embodiments of the disclosed technology, a user of a digital wallet application may already have a digital card for a merchant that he/she wishes to conduct a transaction with. However, in some cases the user may wish to process a transaction requiring more assets than he/she currently has associated with a digital card. In some other instances, the user can initiate a transaction only to have the transaction denied for having insufficient assets associated with a digital card. In these cases, the user does not require a new barcode; rather, the user can request a transfer of assets to complete the balance of the required.

Figure 5:
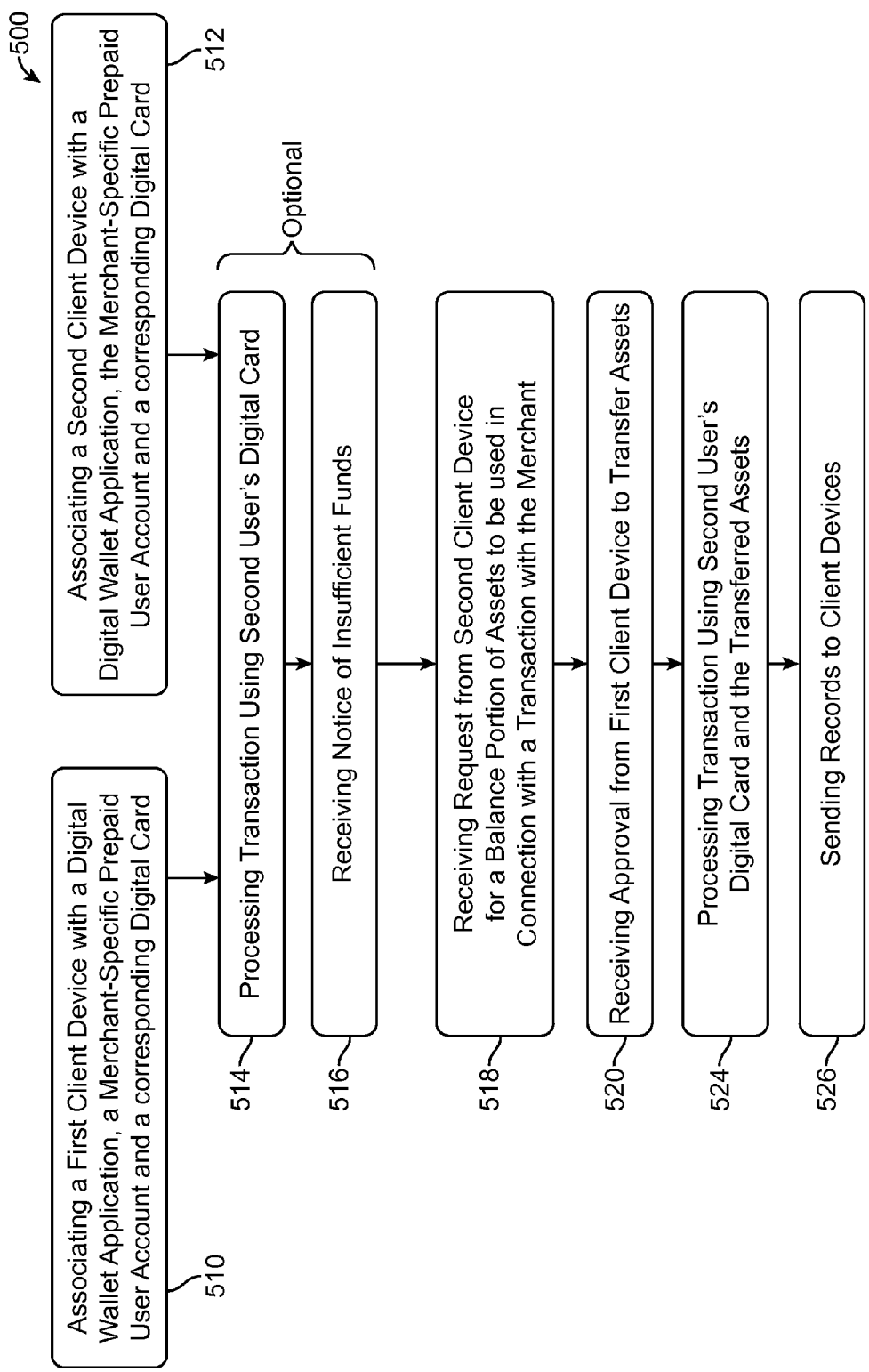
FIG. 5 illustrates an exemplary method of receiving a request for the balance of a transaction and transferring assets to an existing digital card.

FIG. 5 illustrates an exemplary method 500 of receiving a request for the balance of a transaction and transferring assets to an exiting digital card. The method 500 begins with associating 510 a first client device with a digital wallet application, a merchant-specific prepaid user account, and a corresponding digital card and associating 512 a second client device with a digital wallet application, a merchant-specific prepaid user account, and a corresponding digital card.

Optionally, the method 500 involves the second user attempting to process a transaction using the second user's digital card 514, but receiving an indication that the account associated with the digital card contains insufficient funds 516.

Whether the second user attempted and failed to complete a transaction or whether the client knows that his/her balance is insufficient to complete a transaction in advance of an attempt, the method 500 next involves receiving a request from the second device for assets to be used in connection with a balance amount for a transaction with a merchant 518.

Next, the method 500 involves receiving approval from the first device to transfer the assets 520, processing a transaction using the transferred funds 524, and sending transfer records to the first device, the second device, or both the first device and second device 526.

Gifting

Figure 6:
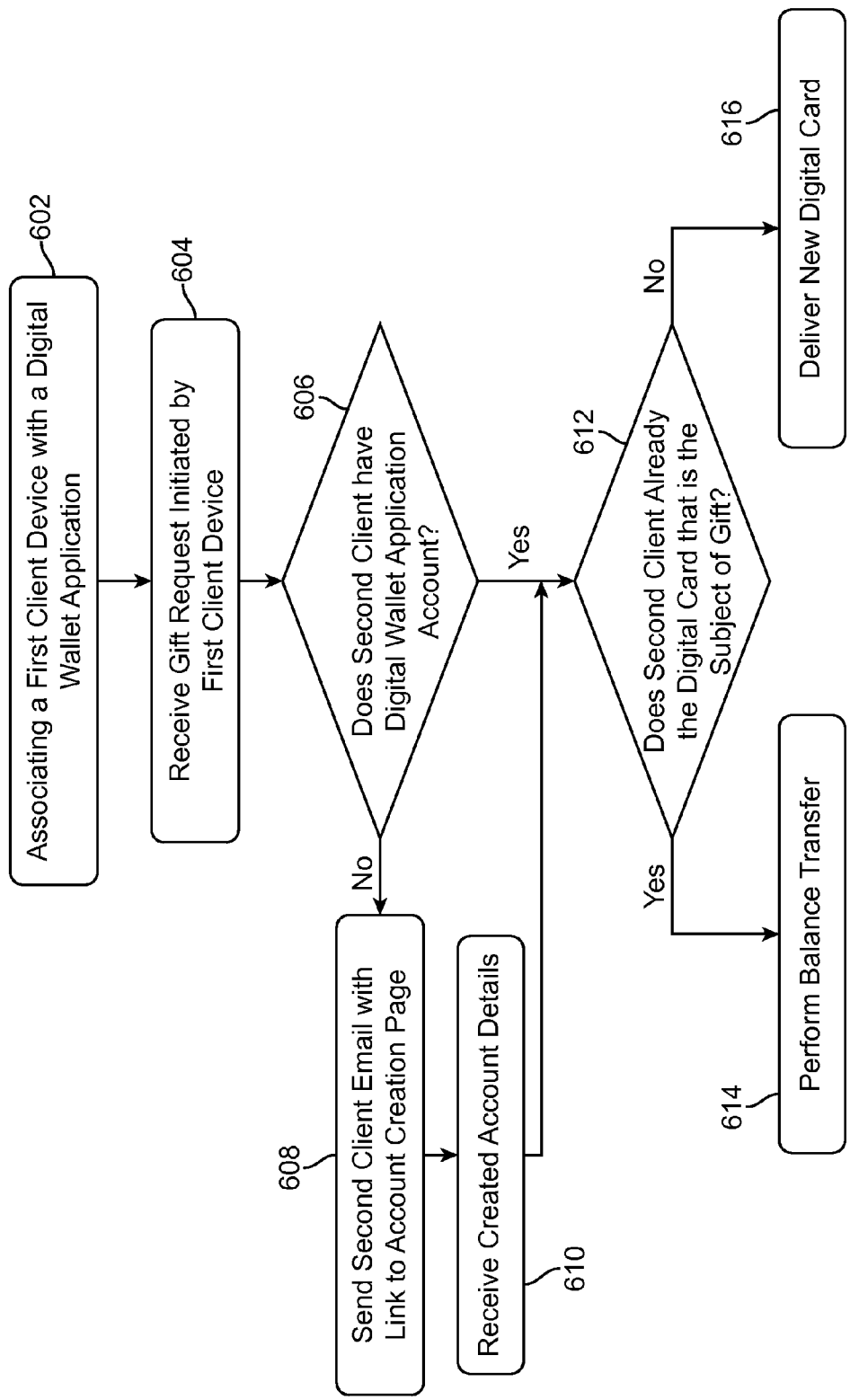
FIG. 6 illustrates a method of gifting a digital card or digital card assets.

In some embodiments of the present disclosure, the client device that is transferring can initiate a transfer of assets. This process is easily understood by thinking of the transfer as a gift to a recipient; however, those with ordinary skill in the art having the benefit of the disclosure will readily understand that a transferor-initiated transfer can include a gift, a loan, a micro loan, a repayment of debt, a payment for a wager, a payment for goods or services, etc. FIG. 6 illustrates an exemplary method 600 of gifting a digital card or digital card assets. The method 600 involves associating a first client device with a digital wallet application 602 and receiving a gift request from the first client device to send a gift to a second client device 604, wherein the gift request identifies a digital card and specifies the assets to transfer along with that digital card. The request can identify the second client device by phone number, email address, etc. and a mobile payment engine searches an account database for the client device associated with the identification information. Next, a determination 606 is made as to whether the second client device already has a digital wallet application installed. If not, the mobile payment engine forwards a message or notification to the second device 608 indicating that the user of the second client device has been given a gift and instructing the user of the second client device to install the digital wallet application in order to redeem the gift. Upon the user of the second client device downloading and installing the digital wallet application (e.g. from an internal partner), the method 600 includes receiving account details 610 for the second client device.

Once an account is created, or if it was determined that the second client device was already associated with an account at step 606, the method 600 makes another determination 612 into whether or not the digital wallet application associated with the second client device is also associated with the same digital card that is identified in the gift request. If so, the mobile payment engine performs an asset balance transfer 614 to the digital card associated with the second client device in an amount specified in the gift request. If the second client device is not already associated with the digital card that is specified in the gift request, the mobile payment engine delivers a new digital card 616 containing the assets specified in the gift request to the digital wallet application associated with the second client device.

Internal Transfer Between Digital Cards

In some embodiments of the present disclosure, a merchant can chose to allow a client device to transfer assets from their digital card account to the digital card account of another merchant. For example, two merchants may have a partnership agreement between them that allows such cross-card transfers upon the acceptance of a condition. A retail merchant can have a café located within their premises and the retail merchant may allow a cross-card transfer upon the user of the client device agreeing to purchase items of an equal amount with the retail merchant, i.e. in-store credit financing.

Figure 7:
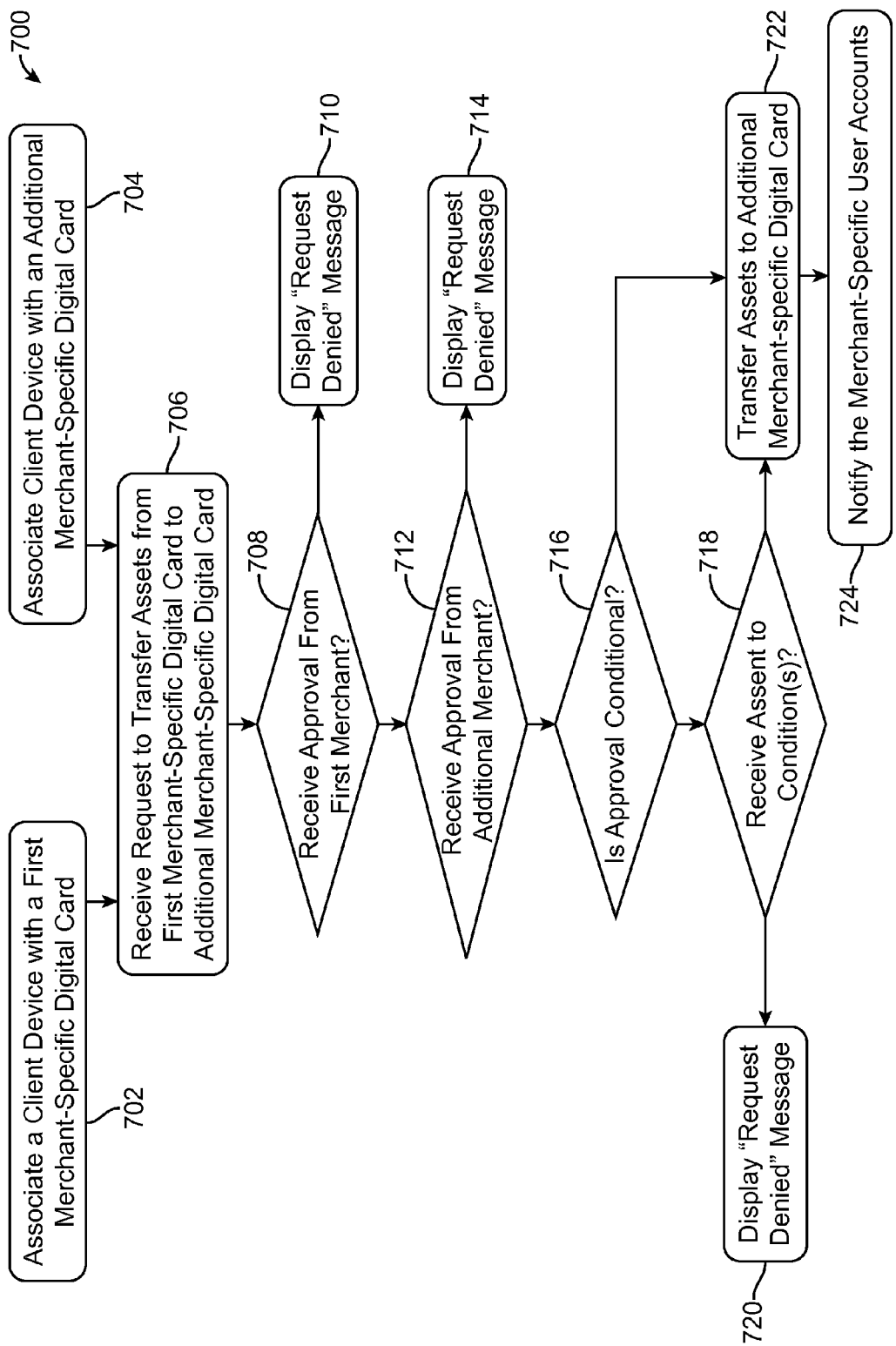
FIG. 7 illustrates a method of transferring digital card assets from a first digital card account to an additional digital card account.

FIG. 7 illustrates a method 700 of transferring digital card assets from a first digital card account to an additional digital card account according to some embodiments of the disclosed technology. The method 700 can be performed on the digital card platform and can involve associating a client device with a first merchant-specific digital card 702 and associating the client device with an additional merchant-specific digital card 704. Next, the digital card platform receives a request from the client device to transfer assets from the first merchant-specific digital card account to an additional merchant-specific digital card account 706.

Additionally, the digital card platform can verify that the first merchant and the additional merchant assent to the transfer. Therefore, the method involves a determination 708 regarding whether the first merchant approves of the transfer. If not, a message or notification is sent to the client device that the request was denied 710. However, if the request is approved, the digital card platform makes an additional determination 712 regarding whether the additional merchant approves of the transfer. If not, a message or notification is sent to the client device that the request was denied 714. Conversely, if the additional merchant approves of the transfer, the digital card platform makes a determination 716 regarding whether either merchant placed one or more conditions on the approval. If conditions are placed on the approval, the digital card platform can send the client device a message or notification that conditions are placed on the approval and provide the particular conditions.

Next, the digital card platform determines 718 if the conditions(s) have been agreed to by a user of the client device. If not, a message or notification is sent to the client device that the request was denied 720. If the condition(s) are assented to, or if the merchants do not require assent to conditions, the digital card platform processes the transfer of assets to the additional merchant-specific digital card 722.

The method 700 can also involve notifying both the first merchant-specific digital card account and the additional merchant-specific digital card account that the transfer has been assented to and processed 724.

Bill-Splitting

In some embodiments of the disclosed technology, users of client devices may wish to transfer assets between digital cards in order to split a bill in which each user is partially responsible for. For example, if a group of diners each order food or drinks at a restaurant, they can chose to pay the bill by: dividing the bill by the number of party members, each party member contributing a dollar amount for their portion of the bill through their individual restaurant-issued digital cards, or one diner paying the entire bill and receiving recompense from his/her fellow diners for their share.

Figure 8:
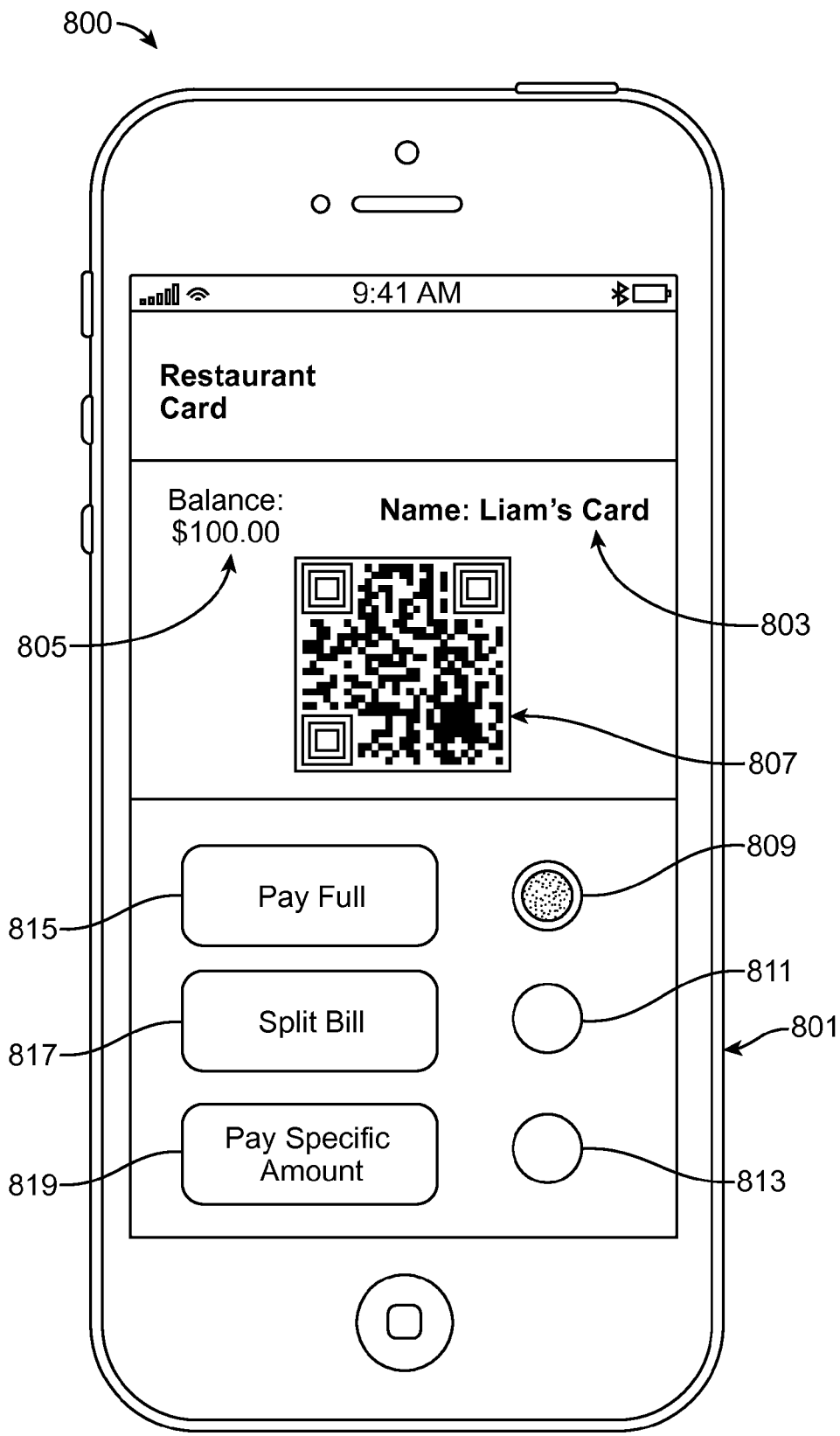
FIG. 8 illustrates an exemplary interface for indicating how to process an optical code payment for a group bill.

FIG. 8 illustrates an exemplary interface for indicating how to process an optical code payment for a group bill. FIG. 8 illustrates a client device 800 displaying a digital card 801 for a restaurant. The digital card 801 displays a user name 803, a card balance 805, and an optical code 807 that can be used to make a payment with the restaurant. Additionally, the digital card 801 includes a list of payment options 815, 817, 819 that can be selected using radio buttons 809, 811, 813. By selecting a particular radio button, a user can indicate the payment method that he/she would like to make with the restaurant.

Figure 9:
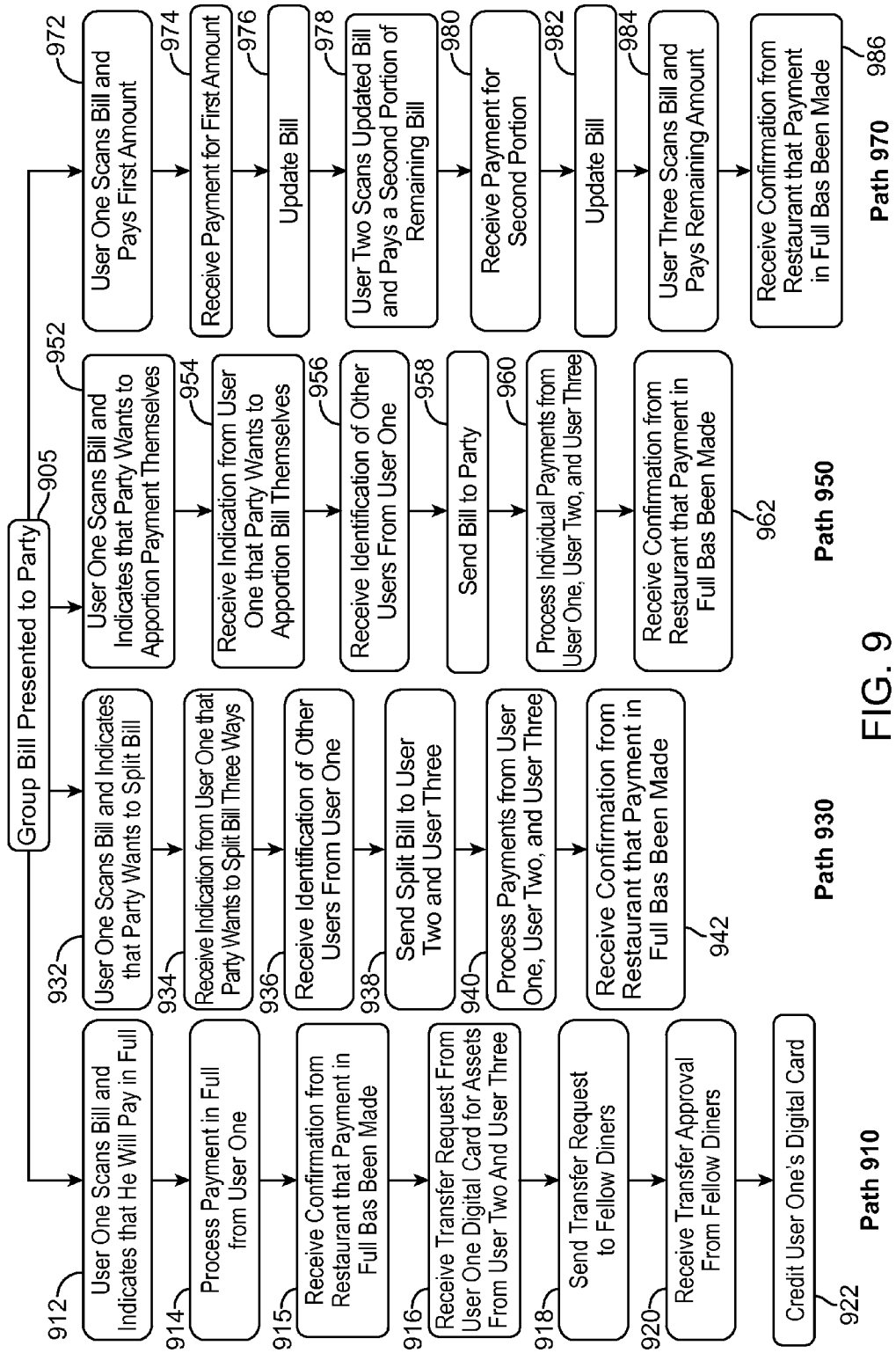
FIG. 9 illustrates a method of splitting a common bill using one or more restaurant-issued digital cards.

FIG. 9 illustrates a method 900 of splitting a common bill using one or more restaurant-issued digital card according to some embodiments of the disclosed technology. The method 900 involves four different paths, which can be followed depending on how a party of diners decides to pay a bill. First, a group bill is presented to the party 905.

Path 910 involves a first user scanning the bill and indicating that he/she would like to pay in full 912. The mobile payment engine processes the payment from the first user 914 and receives confirmation that a full payment has been made 915. Next, the first user may want to be recompensed from his/her fellow diners and can submit a transfer request. Indeed, path 910 involves a mobile payment engine receiving a transfer request from the first user's digital card for assets to be transferred from his/her fellow diners 916. The mobile payment engine sends the transfer requests to the other diners 918, receives transfer approval 920, and credits the first user's digital card or other account 922.

Path 930 involves a first user scanning the bill and indicating that the party wants to split the bill evenly 932 and the mobile payment engine receives the indication 934 along with an indication of the identities of the other party members 936. The party member identities can be determined by input provided by the first user (e.g. by telephone number, email address, etc) or the party members can identify themselves by also scanning the bill.

Next, the mobile payment engine splits the bill and sends it to the party members 938, processes individual payments from the party members 940, and receives confirmation 942 from the restaurant that payment has been made in full.

Path 950 involves a first user scanning a digital bill and indicating that the party members would like to apportion payment themselves 952. Next, the party members submit their apportionment and the mobile payment engine receives the party's indication 954 along with an indication of the identities of the other party members 956. The party member identities can be determined by input provided by the first user (e.g. by telephone number, email address, etc.) or the party members can identify themselves by also scanning the bill.

Next, the apportioned bill is sent to the party members 958 and the individual payments are received and processed 960. Finally, the mobile payment engine receives a confirmation that the payment has been made 962.

In some embodiments of the disclosed technology, the bill can be presented in a digital form that will receive updates as payments are made. Path 970 involves a first user scanning the bill and paying a portion 972, and the mobile payment engine receiving the payment 974 and updating the bill 976. Likewise, the path 970 involves a second user scanning the bill 978, receiving payment from the second user for an additional portion of the bill 980, updating the bill 982, a third user scanning the bill and making the remaining payment 984, and receiving confirmation that the bill has been paid in full 986.

Circle of Trust

Some embodiments of the disclosed technology involve a digital wallet application allowing users to indicate certain other users as being trustworthy of receiving asset transfers from their digital cards without necessitating further consent from the lending/gifting user or with relaxed consent requirements.

For example, a family might set up a circle of trust between their client devices configured with digital wallets. A first family member can install a café's digital card on her device, a second family member can install an airline frequent flier card in his digital wallet, and a third family member has a digital passkey to access a gym at which the family has a family membership. A fourth family member might not have either card associated with his digital wallet. In some embodiments of the present disclosure, the fourth family member can access the benefits of the airline card, café card, and the gym card by utilizing a digital wallet circle of trust transfer. For instance, the third family member can order from the café and immediately receive a barcode transfer or gift card transfer from the first family member. Likewise, when reserving airline travel, the third user can immediately receive a collection of frequent flier points from the second family member's travel card to satisfy the cost of a ticket. Finally, the fourth family member can utilize the family membership at the gym despite not having his own pass by receiving a fixed time transfer of the family's gym pass to present the gym's front desk gatekeeper.

Figure 10:
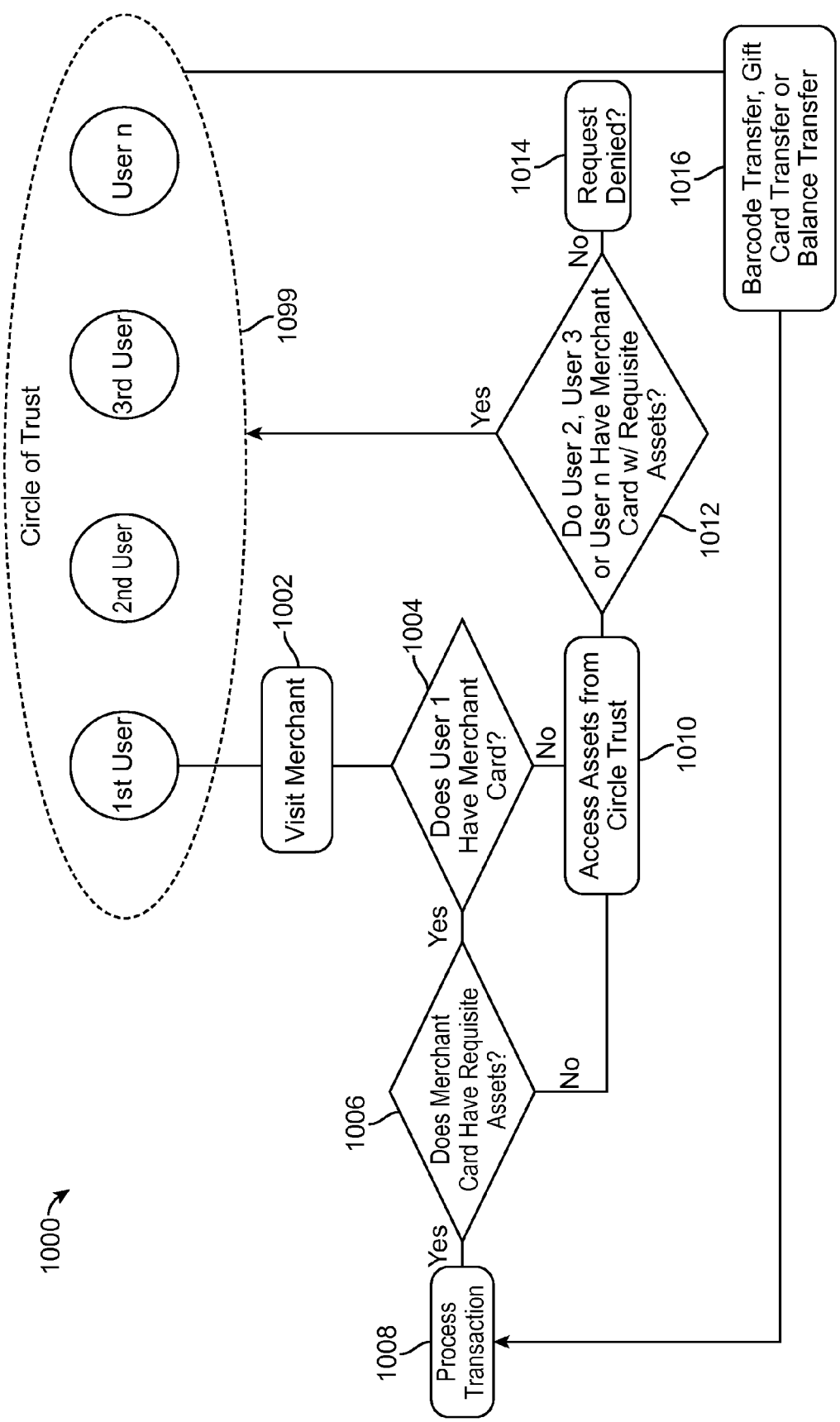
FIG. 10 illustrates a method of transferring assets between members of a circle of trust.

FIG. 10 illustrates a method 1000 of transferring assets between members of a circle of trust 1099 according to some embodiments of the disclosed technology. The method 1000 involves a first user with a client device with a digital wallet application visiting a merchant 1002 and a mobile payment engine determining 1004 if the first user's client device is associated with a digital card specific to that merchant. If so, the method 1000 involves determining 1006 if the user's merchant-specific digital card contains the requisite assets needed to process a transaction. If so, the method 1000 involves the client device sending the mobile payment engine a request to process the transaction and the mobile payment engine processing the transaction 1008. However, if the user's digital card does not contain requisite assets or if the user does not have a merchant-specific card, the method 1000 involves attempting to access the requisite assets for the merchant 1010 from the user's circle of trust. The mobile payment engine determines 1012 if the user's circle of trust contains a client device having the merchant-specific digital card and the requisite assets to complete the transaction. If not, the transaction request is denied 1014; however, if the circle of trust contains a client device having the merchant-specific digital card with requisite assets, the method 1000 involves the mobile payment engine performing a balance transfer, barcode transfer, gift card transfer, etc. 1016 and processing the transaction 1008.

Figure 11:
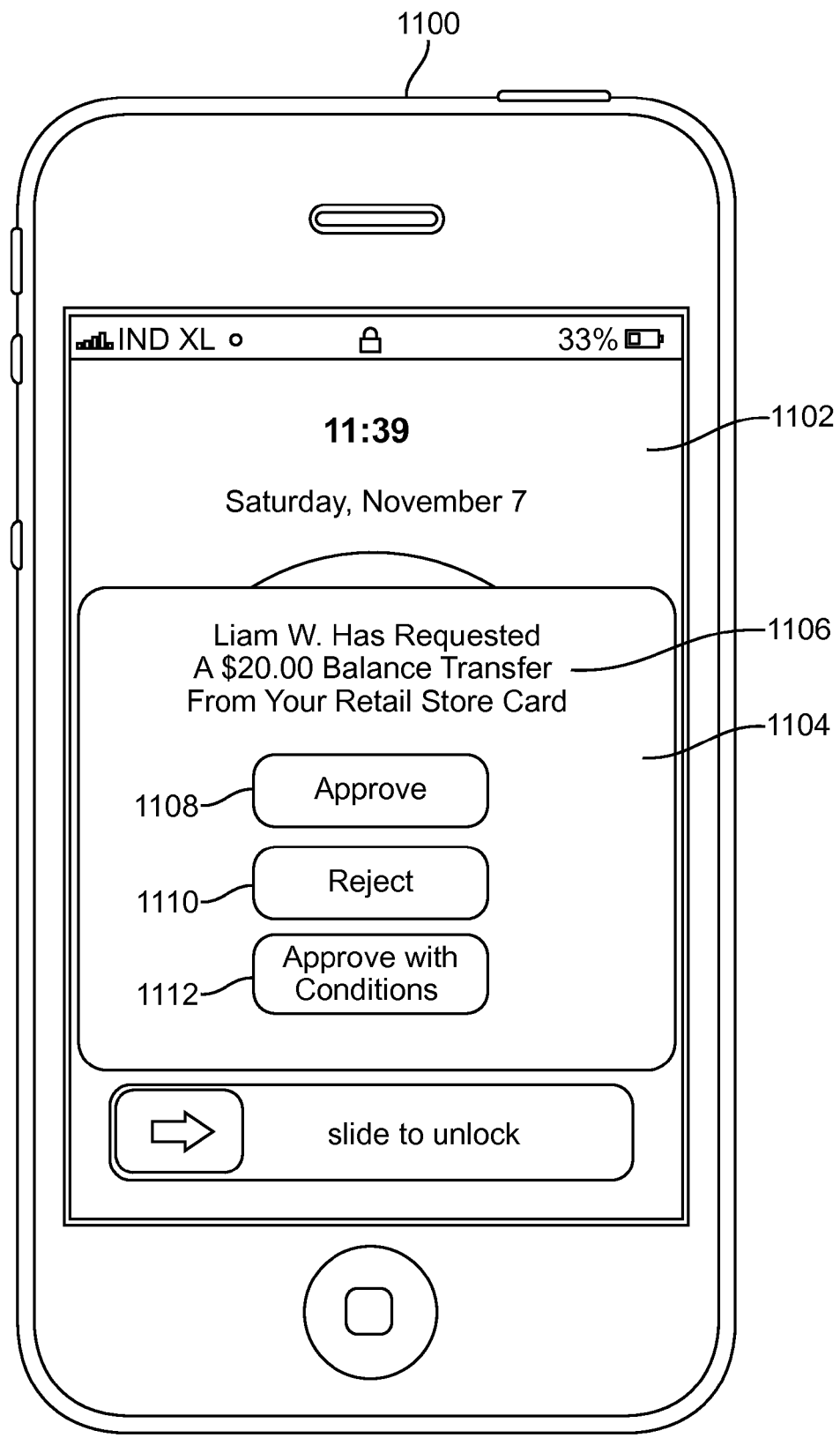
FIG. 11 illustrates examples of notifications relating to the presence of digital card asset transfers.

As mentioned above, some embodiments of the disclosed technology involve receiving notifications relating to digital card asset transfer requests. FIG. 11 illustrates examples of notifications relating to the presence of digital card assets transfers according to some embodiments of the disclosed technology.

As shown in FIG. 11, a client device 1100 displays an unlock screen 1102 with an overlaid notification interface 1104. The notification interface 1104 includes a transfer request message 1106 and a plurality of interactive buttons response 1108, 1110, 1112 for addressing the subject of the request message.

As shown in FIG. 11, the interactive response buttons include a button 1108 to indicate approval of the request message, a button 1110 to indicate rejection of the request message, and a button 1112 to indicate approval of the request message subject to conditions. In some embodiments, clicking, tapping, etc. button 1112 automatically causes the display of another digital wallet interface (not shown) configured to specify conditions.

Although a specific notification scheme, interface, and button types are explicitly described in FIG. 11, those with ordinary skill in the art having the benefit of this disclosure will readily understand that a wide variety of other notifications schemes, interfaces, button types, etc., now known or later developed, can be used with client devices to benefit from the disclosed technology.

Figure 12:
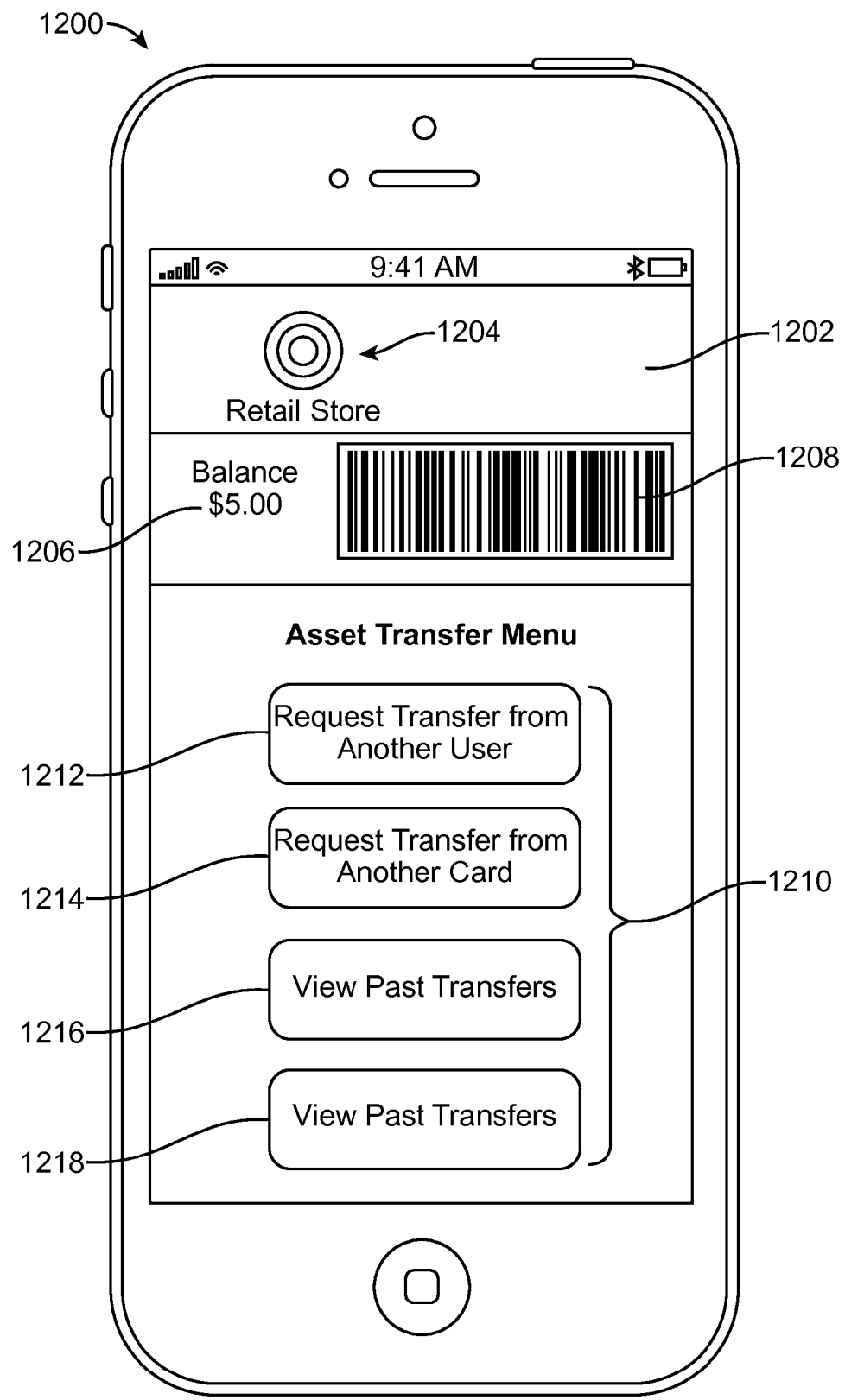
FIG. 12 illustrates examples of interfaces for performing digital card asset transfer request and transfers.

As mentioned above, in some embodiments of the disclosed technology, a digital card interface can include an interface for transferring assets. FIG. 12 illustrates examples of interfaces for performing digital card assets transfer requests and transfers.

As shown in FIG. 12, a client device 1200 displays digital card 1202 including an indication 1204 relating to card type, an asset balance 1206, an optical code 1208 for processing transactions with merchants, and an asset transfer menu 1210. In some embodiments of the disclosed technology, the asset transfer menu 1210 includes a plurality of interactive buttons 1212, 1214, 1216, 1218 configured with digital card transfer options.

As shown in FIG. 12, button 1212 is configured to allow a user of the client device 1200 to request an asset transfer from another user's digital wallet; button 1214 is configured to allow a user of a client device 1200 to request an asset transfer from another of the user's digital cards; button 1216 is configured to view past transfers to others; and button 1218 is configured to allow a user of a client device 1200 to view past received transfers.

Figure 13:
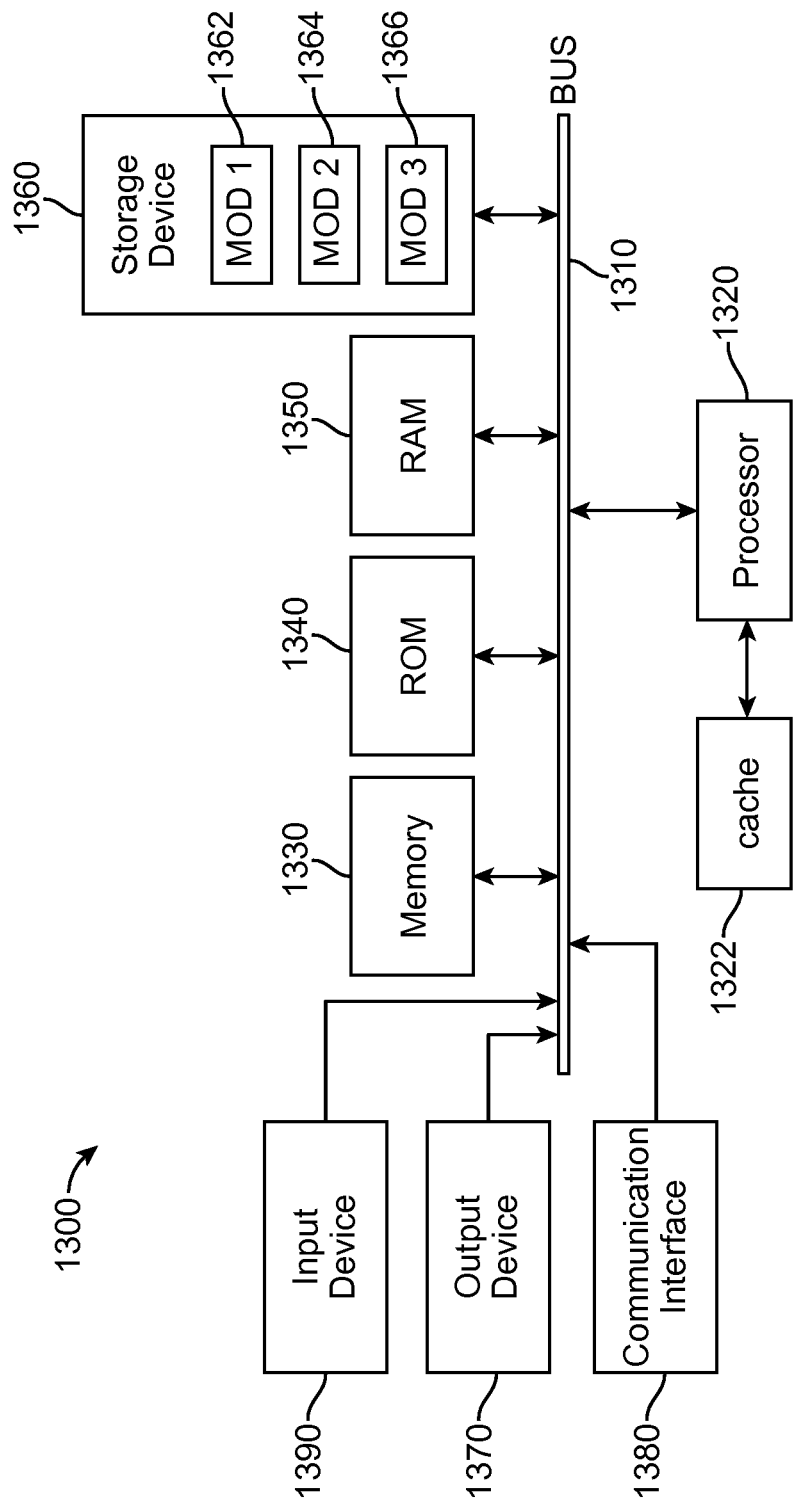
FIG. 13 illustrates an exemplary computer system employed to practice the various embodiments of the disclosure.

A brief introductory description of a basic general-purpose system or computing device in FIG. 13, which can be employed to practice the concepts, disclosed herein.

Although a specific menus, interfaces, and button types are explicitly described in FIG. 12, those with ordinary skill in the art having the benefit of this disclosure will readily understand that many other notifications scheme, interfaces, button types, etc., now known or later developed, can be used with client devices to benefit from the disclosed technology.

With reference to FIG. 13, an exemplary system 1300 includes a general-purpose computing device 1300, including a processing unit (CPU or processor) 1320 and a system bus 1310 that couples various system components including the system memory 1330 such as read only memory (ROM) 1340 and random access memory (RAM) 1350 to the processor 1320. The system 1300 can include a cache 1322 connected directly with, in close proximity to, or integrated as part of the processor 1320. The system 1300 copies data from the memory 1330 and/or the storage device 1360 to the cache for quick access by the processor 1320. In this way, the cache provides a performance boost that avoids processor 1320 delays while waiting for data. These and other modules can control or be configured to control the processor 1320 to perform various actions. Other system memory 1330 may be available for use as well. The memory 1330 can include multiple different types of memory with different performance characteristics. It can be appreciated that the disclosure may operate on a computing device 1300 with more than one processor 1320 or on a group or cluster of computing devices networked together to provide greater processing capability. The processor 1320 can include any general purpose processor and a hardware module or software module, such as module 1 1362, module 2 1364, and module 3 1366 stored in storage device 1360, configured to control the processor 1320 as well as a special-purpose processor where software instructions are incorporated into the actual processor design. The processor 1320 may essentially be a completely self-contained computing system, containing multiple cores or processors, a bus, memory controller, cache, etc. A multi-core processor may be symmetric or asymmetric.

The system bus 1310 may be any of several types of bus structures including a memory bus or memory controller, a peripheral bus, and a local bus using any of a variety of bus architectures. A basic input/output (BIOS) stored in ROM 1340 or the like, may provide the basic routine that helps to transfer information between elements within the computing device 1300, such as during start-up. The computing device 1300 further includes storage devices 1360 such as a hard disk drive, a magnetic disk drive, an optical disk drive, tape drive or the like. The storage device 1360 can include software modules 1362, 1364, 1366 for controlling the processor 1320. Other hardware or software modules are contemplated. The storage device 1360 is connected to the system bus 1310 by a drive interface. The drives and the associated computer readable storage media provide non-volatile storage of computer readable instructions, data structures, program modules and other data for the computing device 1300. In one aspect, a hardware module that performs a particular function includes the software component stored in a non-transitory computer-readable medium in connection with the necessary hardware components, such as the processor 1320, bus 1310, display 1370, and so forth, to carry out the function. The basic components are known to those of skill in the art and appropriate variations are contemplated depending on the type of device, such as whether the device 1300 is a small, handheld computing device, a desktop computer, or a computer server.

Although the exemplary embodiment described herein employs the hard disk 1360, it should be appreciated by those skilled in the art that other types of computer readable media which can store data that are accessible by a computer, such as magnetic cassettes, flash memory cards, digital versatile disks, cartridges, random access memories (RAMs) 1350, read only memory (ROM) 1340, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 1300, an input device 1390 represents any number of input mechanisms, such as a microphone for speech, a touch-sensitive screen for gesture or graphical input, keyboard, mouse, motion input, speech and so forth. An output device 1370 can also be one or more of a number of output mechanisms known to those of skill in the art. In some instances, multimodal systems enable a user to provide multiple types of input to communicate with the computing device 1300. The communications interface 1380 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 1320. The functions these blocks represent may be provided through the use of either shared or dedicated hardware, including, but not limited to, hardware capable of executing software and hardware, such as a processor 1320, that is purpose-built to operate as an equivalent to software executing on a general purpose processor. For example the functions of one or more processors presented in FIG. 13 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 1340 for storing software performing the operations discussed below, and random access memory (RAM) 1350 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 1300 shown in FIG. 13 can practice all or part of the recited methods, can be a part of the recited systems, and/or can operate according to instructions in the recited non-transitory computer-readable storage media. Such logical operations can be implemented as modules configured to control the processor 1320 to perform particular functions according to the programming of the module. For example, FIG. 13 illustrates three modules Mod1 1362, Mod2 1364 and Mod3 1366 which are modules configured to control the processor 1320. These modules may be stored on the storage device 1360 and loaded into RAM 1350 or memory 1330 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A computer-implemented method comprising:

receiving, by a computer processor of a mobile payment platform, a transfer request from a first client device to transfer a first monetary amount to the first client device from an account associated with a second client device;

upon a determination that the account contains at least the first monetary amount, transmitting, from the computer processor of the mobile payment platform to the second client device, an approval request comprising instructions for generating a user interface at the second client device that displays information describing the transfer of the first monetary amount and selectable user interface elements for causing the second client device to generate and transmit an approval to transfer the first monetary amount to the first client device that identifies a fixed time duration during which the approval is valid;

receiving, by the computer processor of the mobile payment platform from the second client device, the approval to transfer the first monetary amount to the first client device;

transferring, from the computer processor of the mobile payment platform to the first client device, a code that can be displayed by the first client device and is redeemable for the first monetary amount;

receiving, by the computer processor of the mobile payment platform from a point of sale (POS) device, an authorization request including the code, the code having been provided to the POS device by the first client device;

determining, by the computer processor of the mobile payment platform, whether the first time duration has lapsed; and upon a determination that the first time duration has not lapsed, transferring, by the computer processor of the mobile payment platform, at least a portion of the first monetary amount from the account associated with the second client device to an account associated with the POS device.

2. The computer-implemented method of claim 1, wherein the code is an optical code which, when scanned by the POS device, provides the POS device with the code.

3. The computer-implemented method of claim 1, wherein the account is linked to a first merchant and the POS device is linked to a second merchant.

4. The computer-implemented method of claim 3, wherein receiving the approval to transfer the first monetary amount further comprises receiving approval from the second merchant.

5. The computer-implemented method of claim 4, further comprising:

receiving, by the computer processor of the mobile payment platform from the first client device, acceptance of a condition imposed by the first merchant before receiving approval to transfer the first monetary amount.

6. The computer-implemented method of claim 1, wherein the account is further associated with a third client device, and wherein receiving the approval to transfer the first monetary amount further comprises receiving approval from the third client device.

7. The computer-implemented method of claim 6, further comprising:
    creating, by the computer processor of the mobile payment platform, a group of one or more trusted user accounts associated with the user account; and
    automatically providing, by the computer processor of the mobile payment platform, the approval to transfer the first monetary amount to the first client device when the first client device is associated with a trusted user account from the group of one or more trusted user accounts.

8. The computer-implemented method of claim 1, wherein the first monetary amount is specified in the transfer request.

9. The computer-implemented method of claim 1, wherein the first monetary amount is specified by the POS device.

10. A mobile payment system comprising:
    a computer processor; and
    a memory containing instructions that, when executed, cause the computer processor to:
        receive a transfer request from a first client device to transfer a first monetary amount to the first client device from an account associated with a user of a second client device;
        upon a determination that the account contains at least the first monetary amount, transmit an approval request comprising instructions for generating a user interface at the second client device that displays information describing the transfer of the first monetary amount and selectable user interface elements for causing the second client device to generate and transmit an approval to transfer the first monetary amount to the first client device that identifies a fixed time duration during which the approval is valid;
        receive, from the second client device, the approval to transfer the first monetary amount to the first client device;
        transfer, to the first client device, a code that can be displayed by the first client device and is redeemable for the first monetary amount;
        receive, from a point of sale (POS) device, an authorization request including the code, the code having been provided to the POS device by the first client device;
        determine whether the first time duration has lapsed; and
        upon a determination that the first time duration has not lapsed, transfer at least a portion of the first monetary amount from the account associated with the user of the second client device to an account associated with the POS device.

11. The mobile payment system of claim 10, wherein the code is an optical code which, when scanned by the POS device, provides the POS device with the code.

12. The mobile payment system of claim 10, wherein the account is linked to a first merchant and the POS device is linked to a second merchant.

13. The mobile payment system of claim 12, wherein receiving the approval to transfer the first monetary amount further comprises receiving approval from the second merchant.

14. The mobile payment system of claim 13, wherein the instructions further cause the computer processor to:
    receive, from the first client device, acceptance of a condition imposed by the first merchant before receiving approval to transfer the first monetary amount.

15. The mobile payment system of claim 10, wherein the account is further associated with a third client device, and wherein receiving the approval to transfer the first monetary amount further comprises receiving approval from the third client device.

16. The mobile payment system of claim 15, wherein the instructions further cause the computer processor to:
    create a group of one or more trusted user accounts associated with the user account; and
    automatically provide the approval to transfer the first monetary amount to the first client device when the first client device is associated with a trusted user account from the group of one or more trusted user accounts.

17. The mobile payment system of claim 10, wherein the first monetary amount is specified in the transfer request.

18. The mobile payment system of claim 10, wherein the first monetary amount is specified by the POS device.

19. A non-transitory computer-readable medium containing instructions that when executed by a computer processor of a mobile payment system, cause the computer processor to:
    receive a transfer request from a first client device to transfer a first monetary amount to the first client device from an account associated with a user of a second client device;
    upon a determination that the account contains at least the first monetary amount, transmit an approval request comprising instructions for generating a user interface at the second client device that displays information describing the transfer of the first monetary amount and selectable user interface elements for causing the second client device to generate and transmit an approval to transfer the first monetary amount to the first client device that identifies a fixed time duration during which the approval is valid;
    receive, from the second client device, the approval to transfer the first monetary amount to the first client device;
    transfer, to the first client device, a code that can be displayed by the first client device and is redeemable for the first monetary amount;
    receive, from a point of sale (POS) device, an authorization request including the code, the code having been provided to the POS device by the first client device;
    determine whether the first time duration has lapsed; and
    upon a determination that the first time duration has not lapsed, transfer at least a portion of the first monetary amount from the account associated with the user of the second client device to an account associated with the POS device.

20. The non-transitory computer-readable medium of claim 19, wherein the code is an optical code which, when scanned by the POS device, provides the POS device with the code.

21. The non-transitory computer-readable medium of claim 19, wherein the account is linked to a first merchant and the POS device is linked to a second merchant.

22. The non-transitory computer-readable medium of claim 21, wherein receiving the approval to transfer the first monetary amount further comprises receiving approval from the second merchant.

23. The non-transitory computer-readable medium of claim 22, wherein the instructions further cause the computer processor to:
    receive, from the first client device, acceptance of a condition imposed by the first merchant before receiving approval to transfer the first monetary amount.

24. The non-transitory computer-readable medium of claim 19, wherein the account is further associated with a third client device, and wherein receiving the approval to transfer the first monetary amount further comprises receiving approval from the third client device.

25. The non-transitory computer-readable medium of claim 24, wherein the instructions further cause the computer processor to:
    create a group of one or more trusted user accounts associated with the user account; and
    automatically provide the approval to transfer the first monetary amount to the first client device when the first client device is associated with a trusted user account from the group of one or more trusted user accounts.

26. The non-transitory computer-readable medium of claim 19, wherein the first monetary amount is specified in the transfer request.

27. The non-transitory computer-readable medium of claim 19, wherein the first monetary amount is specified by the POS device.

* * * * *